(12) United States Patent
Lombriser et al.

(10) Patent No.: US 9,762,342 B2
(45) Date of Patent: Sep. 12, 2017

(54) TRANSMITTING DATA TO AND FROM NODES OF A CLUSTERED MULTI-HOP NETWORK WITH A TDMA SCHEME

(75) Inventors: Clemens Lombriser, Thalwil (CH); Hong Linh Truong, Adliswil (CH)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 212 days.

(21) Appl. No.: 14/346,818

(22) PCT Filed: Jul. 4, 2012

(86) PCT No.: PCT/IB2012/053397
§ 371 (c)(1),
(2), (4) Date: Mar. 24, 2014

(87) PCT Pub. No.: WO2013/046069
PCT Pub. Date: Apr. 4, 2013

(65) Prior Publication Data
US 2014/0233464 A1  Aug. 21, 2014

(30) Foreign Application Priority Data
Sep. 30, 2011  (EP) .................................... 11183539

(51) Int. Cl.
*H04J 3/16* (2006.01)
*H04W 72/04* (2009.01)
*H04W 84/18* (2009.01)

(52) U.S. Cl.
CPC ........... *H04J 3/16* (2013.01); *H04W 72/0446* (2013.01); *H04W 84/18* (2013.01)

(58) Field of Classification Search
None
See application file for complete search history.

(56) References Cited

U.S. PATENT DOCUMENTS 5,926,101 A * 7/1999 Dasgupta ................ H04L 45/00
340/2.81
5,974,056 A * 10/1999 Wilson .................. H04L 12/417
370/509

(Continued)

FOREIGN PATENT DOCUMENTS

| CN | 101494910 A | 7/2009 |
| CN | 102122973 A | 7/2011 |
| CN | 102143570 A | 8/2011 |

OTHER PUBLICATIONS

Dennis Christmann, On the Behavior of Black Bursts in Tick-Synchronized Networks, Tecchnical Report 377/10, University of Kaiserslautern, Jun. 14, 2010.*
Abassi, A.A. et al., "A survey on clustering algorithms for wireless sensor networks", Computer Communications, Oct. 2007, V. 30, Iss. 14-15, p. 2826-2841.

(Continued)

*Primary Examiner* — Jeffrey M Rutkowski
*Assistant Examiner* — Andre Tacdiran
(74) *Attorney, Agent, or Firm* — Cantor Colburn LLP (57) ABSTRACT

A method for transmitting data to and from nodes of a multi-hop network with a Time Division Multiple Access (TDMA) scheme is suggested. The network is clustered into N clusters, wherein each cluster of the N clusters has at least one of the nodes. In a first step, the TDMA scheme is organized by periodic superframes. Each superframe of the periodic superframes has a number of frames including at least one broadcast frame and one collection frame for the N clusters. In a second step, one dedicated communication channel is shared by the N clusters within the broadcast frame. In a third step, N separate communication channels are used by the N clusters within the collection frame.

10 Claims, 8 Drawing Sheets

(56) References Cited

U.S. PATENT DOCUMENTS

| | | | |
|---|---|---|---|
| 6,034,966 | A | 3/2000 | Ota |
| 6,735,630 | B1 | 5/2004 | Gelvin |
| 7,830,834 | B2 | 11/2010 | Das |
| 8,615,599 | B1* | 12/2013 | Takefman ............... H04L 45/18 709/236 |
| 2006/0067337 | A1* | 3/2006 | Netravali ............... H04L 45/04 370/400 |
| 2006/0250999 | A1* | 11/2006 | Zeng ................... H04L 12/189 370/312 |
| 2008/0198774 | A1 | 8/2008 | Li |
| 2008/0232334 | A1 | 9/2008 | Das |
| 2008/0253327 | A1* | 10/2008 | Kohvakka ............. H04W 16/14 370/330 |
| 2009/0079580 | A1* | 3/2009 | Kaplan ............. G08B 21/0227 340/686.6 |
| 2009/0290558 | A1* | 11/2009 | Wermuth ............ H04W 72/082 370/336 |
| 2011/0268139 | A1* | 11/2011 | Caracas ................ H04J 3/0652 370/503 |
| 2011/0310770 | A1* | 12/2011 | Liang .................... H04W 84/18 370/254 |
| 2012/0201231 | A1* | 8/2012 | Omeni ................. H04B 7/2656 370/337 |

OTHER PUBLICATIONS

Bachir, A et al., "MAC Essentials for Wireless Sensor Networks", IEEE Communications Surveys & Tutorials. 2010; V. 12 Iss. 2, p. 222-248.

Bandyopadhyay, S et al., "An Energy Efficient Hierarchical Clustering Algorithm for Wireless Networks", I22 Annual Joint Conf of IEEE Comp and Comm IEEE Soc, V. 3, p. 1713-23.

Karn, P et al., "MACA—A New Channel Access Method for Packet Radio," in 9th ARRL Computer Networking Conference, 1990.

Lotfinezhad, M et al., "Energy Efficient Clusering in Sensor Networks with Mobile Agents", Mar. 2005, Proc. IEEE Wireless Comm. and Net Conf. pp. 1872-1877, USA.

Mishra, S et al., "An Adaptive Low Power Reservation Based Mac Protocol for Wireless Sensor Networks", 2004, IEEE Intl Conf. on Performance, Comp, and Comm. p. 731-736.

Nieminen, J et al., "Network-Wide Time Synchronization in Multi-Channel Wireless Sensor Networks", 2011, Wireless Sensor Network, vol. 3 No. 2, pp. 39-53.

Sobrinho, J et al., "Quality-of-service in ad hoc carrier sense multiple access wireless networks", 1999, IEEE Journal on Selected Areas in Comm, V.17 I. 8, 1353-1368.

Younis, O et al., "Node Clustering in Wireless Sensor Networks: Recent Developments and Deployment Challenges", 2006, IEEE Networks, V. 20, I. 3, p. 20-15.

* cited by examiner

TRANSMITTING DATA TO AND FROM NODES OF A CLUSTERED MULTI-HOP NETWORK WITH A TDMA SCHEME

CROSS-REFERENCE TO RELATED APPLICATIONS

This application claims priority under 35 U.S.C. §371 from PCT Application, PCT/IB2012/053397, filed on Jul. 4, 2012, which claims priority from the European Patent Application No. 11183539.3, filed on Sep. 30, 2011. The entire contents of both applications are incorporated herein by reference.

FIELD OF THE INVENTION

The invention relates to a method and to a device for transmitting data to and from nodes of a multi-hop network with a Time Division Multiple Access (TDMA) scheme, in particular a TDMA-based low-power sensor network. The network is clustered into a plurality of clusters, wherein each cluster of the plurality of clusters comprises a number of the nodes.

BACKGROUND

In a low-power sensor network, in particular in a battery-operated wireless sensor network, it is very important to switch off the radio transceivers of the sensor nodes during their idle periods to save energy. Idle periods are time periods in which the nodes have nothing to send or to receive. A further important aspect is to avoid collisions when transmitting messages or to minimize overhearing messages that are not destined to the respective node.

In such a context, TDMA-based systems are inherently energy-efficient because the nodes of the system have a clearly defined schedule which defines the time slots within which they need to turn on their radio transceiver for sending or receiving messages. In all other time slots, the respective node may turn off its radio transceiver. By means of an appropriate time slot assignment, it is possible to wake up senders and receivers at the same time slot so that they can exchange the messages over the network.

Many-to-one communication in a multi-hop network is a very common requirement of sensor network applications, e.g. in the field of environmental monitoring or data gathering, in which the sensor nodes exchange information with a sink node essentially and generally not between themselves. In this regard, the sensor nodes usually generate periodic data samples and send these generated periodic data samples to the sink node for further processing. The opposite direction from the sink node to the other sensor nodes may be also used, e.g. for sending control information from the sink node to the other nodes. The routes or branches between the sink node and the further sensor nodes may form a multi-hop tree routed at the sink node and spanning over all the nodes.

For communicating in the network, the TDMA scheme may be organized by periodic superframes. Each superframe of the periodic superframes may have a number of frames, e.g. including a broadcast frame and a collection frame.

A frame consists of multiple time slots of fixed length. N messages may be sent during a slot. During a slot, a node can be in one of the following three states: sending, receiving, or sleeping. Nodes are awake only during slots that are assigned to them for sending or receiving.

A conventional TDMA superframe structure may not scale for networks with a large number of nodes, because the length of the broadcast and the collection frames increases with the number of network nodes while the length of the superframe is limited by latency requirements. In particular, the broadcast frame may be used by the parent nodes to broadcast information, e.g. synchronization information. For this aim, each parent node is assigned a slot within the broadcast frame and uses this slot to broadcast their messages to their child nodes, i.e. a broadcast frame contains as many slots as there are parent nodes in the network.

Slots in the collection frame may be used by the sensor nodes to send their periodic data to the sink. The number of slots assigned to a node depends on the amount of traffic created by their descendant nodes—if any—plus the one created by itself. Assuming that every node in the network has per superframe at least one message to be transferred to the sink, then the number of slots required for the collection frame will always be larger than the number of nodes in the network.

This scalability problem may be resolved by means of clustering, a well-known approach in which networks with a large number of nodes are divided into groups of smaller number of nodes called clusters. Each cluster may then have its own sink, its own routing tree, and its own TDMA scheduling, thus it is easier manageable than a single large network.

Furthermore, frequency (FDMA; Frequency-Division Multiple Access) or code (CDMA; Code-Division Multiple Access) multiplexing may be used to permit concurrent transmissions of the nodes in different clusters. For example, IEEE 802.15.4 standard defines in the 2.4 GHz ISM band 16 independent FDMA channels, each of which may be used by a different cluster such that nodes in different clusters may transmit in parallel without interfering with each other.

Clustering has been extensively studied in the scientific literature, see for example references [1] or [2]. Most of them are dealing with algorithms of how to form clusters or how to select a cluster head. Further, there is also a large body of work on MAC protocols. No other MAC solution however makes use of a common TDMA broadcast tree for synchronization and additional slotted frames on different frequencies for the cluster data collection. A current overview is available in reference [4].

Further, document U.S. Pat. No. 6,034,966 A describes a control method of data transmission for the multiplexing bus system network and wireless network The transmission control method for use in a network includes a time division multiplexing channel and a contention control channel. At least one station and a central control unit are connected both to a contention control channel and a time division multiplexing (TDMA) channel. When a station starts a time division multiplexing session, it transmits an access request to the central control unit via the contention control channel. After the central control unit receives the access request, the station which transmitted the access request is included in the order of the time division multiplexing (TDMA). The central control unit repeatedly transmits a transmission permitting token to the station via the TDMA channel in accordance with the order of the time division multiplexing. The station which received the transmission permitting token transmits the data entity, if existing, to either the other station or the central control unit via the second communication channel, and also transmits a transmission terminating token to the central control unit via the second communication channel. When the central control unit receives the transmission terminating token, it transmits the transmission permitting token via the second communication channel to the next station in the order of the time division multiplexing.

Document U.S. Pat. No. 6,735,630 B1 shows a method for collecting data using compact internetworked wireless integrated network sensors (WINS). Moreover, U.S. Pat. No. 7,830,834 B2 describes a wireless communication network and a data aggregation method for such a network.

Accordingly, it is an aspect of the present invention to improve the transfer of data to and from nodes of a multi-hop network with a TDMA scheme.

BRIEF SUMMARY OF THE INVENTION

According to a first aspect, a method for transmitting data to and from nodes of a multi-hop network with a TDMA scheme is suggested. The network is clustered into N clusters, wherein each cluster of the N clusters has at least one of the nodes. In a first step, the TDMA scheme is organized by periodic superframes. Each superframe of the periodic superframes has a number of frames including at least one broadcast frame and one collection frame for the N clusters. In a second step, one dedicated communication channel is shared by the N clusters within the broadcast frame. In a third step, N separate communication channels are used by the N clusters within the collection frame.

According to some implementations, a TDMA superframe structure is provided which may be for centralized and clustered wireless sensor networks architectures is provided. In the present TDMA superframe structure, one single synchronization channel, namely the broadcast channel, is shared by the N clusters and multiple channels are used for data collection in the collection frame.

In an embodiment, each cluster of the N clusters has one node acting as a base station, wherein among the N base stations of the N clusters one node acts as main base station.

In a further embodiment, within a configuration phase, a channel indication is provided to each node of the nodes of the network, wherein the channel indication indicates the communication channel allocated to the node within the collection frame.

In a further embodiment, within the broadcast frame, one single broadcast tree that spans over all nodes of the N clusters is used by the main base station to distribute information to all nodes of the network.

In a further embodiment, the broadcast tree is calculated from the whole topology of the network with the main base station as a root.

In a further embodiment, within the collection frame, each cluster of the N clusters has its own collection tree that spans over only the nodes that belong to that cluster and is used by the nodes of that cluster to exchange information with the base station of that cluster.

In a further embodiment, the collection tree of the cluster is calculated from the topology of the cluster with the base station of the cluster as a root.

In a further embodiment, each superframe of the periodic superframes has at least the broadcast frame, the collection frame and a listening frame. Within the broadcast frame, the one dedicated communication channel is shared by the N clusters. Within the collection frame, the N separate communication channels are used by the N clusters. Further, within the listening frame, the one dedicated communication channel is shared by the N clusters.

In a further embodiment, information is exchanged using CSMA or MACA (see reference [5]) within the listening frame for synchronizing un-synchronized nodes with the network.

In a further embodiment, for synchronizing un-synchronized nodes within the network, a black-burst is transmitted at the beginning of the listening frame.

In a further embodiment, the broadcast frame is followed by the listening frame within the superframe.

In a further embodiment, each superframe of the periodic superframes comprises the broadcast frame, the collection frame, a listening frame, a downtree frame and an uptree frame. Within the broadcast frame and within the listening frame, one dedicated communication channel is shared by the N clusters. Within the collection frame, within the downtree frame, and within the uptree frame, the N separate communication channels are used by the N clusters.

In a further embodiment, for the broadcast tree and for each collection tree, the multi-hop network is hierarchically arranged in different levels with one root node, at least one parent node being the parent of at least one child node arranged in a lower level than the parent node and at least one child node.

In particular, the collection frames are configured to periodically transmit data to the root node. Slots in the collection frame may be used by the nodes to send their data, in particular periodic data, to the root or sink node. The number of slots assigned to a node depends on the amount of traffic created by their descendant nodes, if any, plus the one created by it. The length of the collection frame is such that all messages, in particular all periodic messages, created by the nodes can reach the root node within the duration of the collection frame.

Thus, the root node may be the sink for the periodic data. For example, if the multi-hop network is embodied by a low-power sensor network, the periodic data may be periodic sensor data.

The collection frame is configured to provide a means for a multi-hop, collision-free, periodic collection of uptree messages, i.e. messages sent from the nodes to the root. The collection frame may be used by the nodes, in particular by the sensor nodes, to send their regular data to the root node, which may be coupled to a base station. The number of slots assigned to a node may depend on the amount of traffic created by their descendant nodes plus the traffic created by it. The length of the collection frame is long enough, so that all messages created by the nodes can reach the root node within the duration of the collection frame. A slot assignment algorithm may calculate the total number of slots needed and assign them to the nodes.

Regarding the slot assignment algorithm, it may be assumed that, at the beginning of a collection frame, a node $N_i$ has $M_i$ messages to send to the root node. The algorithm has to distribute the slots of the frame among the nodes such that at the end of the frame all messages have reached the root node.

A simple scheduling algorithm that fulfills the above requirement may be to consider first the nodes at the highest level, i.e. farthest away nodes from the root node, and give them as many slots as they need for sending all their messages. The parents of these nodes will have the assigned slots as receiving slots. Then, nodes at the next lower level are considered. Because these nodes have—besides their own messages—also to relay the messages of their descendants, they may get as many sending slots as they need to transfer the messages of their descendants and their own ones. Again, the parents of these nodes will have these slots as receiving slots. The described assignment algorithm is repeated until the nodes at the first level are assigned with sending slots.

As mentioned above, the superframe consists of a number of frames including at least one broadcast frame and one collection frame. The respective frame, for example the broadcast frame, may consist of multiple time slots of a fixed length. During one slot, a number of messages can be transferred. Further, during a slot, a node may be in one of the following three states or modes: sending, receiving or sleeping (idle). Nodes may be only awake during slots that are assigned to them for sending or receiving.

Furthermore, as mentioned above, each parent node is assigned a slot within the broadcast frame and uses this slot to broadcast the messages to its child nodes. These messages may be particularly source-routed so that they are not broadcasted to the whole network, but only forwarded towards their final destination node or nodes. In particular, child nodes may wake up during the broadcast slot of their parents to receive the messages sent by their parents. Particularly, the slots of the broadcast frame are assigned in such a way that the message sent by the sink node at the beginning of the frame reaches its destination nodes in the network within the duration of said broadcast frame.

In one embodiment, the multi-hop network is provided with one root node, at least one parent node being the parent of a least one child node arranged in a lower level than the parent node and at least one child node.

In a further embodiment, a node having a level N is arranged N hops away from the root node, wherein each parent node is assigned its slot in the broadcast frame in dependence on its level N.

In a further embodiment, the method further comprises the steps:
assigning each parent node $N_i$ a level $L_i$ in the multi-hop network,
assigning each parent node $N_i$ a slot $S_i$ in the broadcast frame in dependence on its level $L_i$, wherein the slots are sequentially arranged in the broadcast frame in dependence on a condition $S_i \le S_j$ for all $L_i(N_i) \le L_j(N_j)$ and all $N_i$.

In a further embodiment, each parent node is assigned its slot for re-distributing the synchronization information received from its own parent node in the multi-hop network.

According to a fourth aspect of the invention, a method for transmitting data to nodes of a multiple-hop network with a Time Division Multiple Access (TDMA) scheme is provided, the nodes being hierarchically arranged in different levels and the method comprising:—transmitting synchronization information over the multiple-hop network for synchronizing the nodes of the multiple-hop network by means of the above mentioned method for synchronizing the nodes of the multiple hop network.

In a further embodiment, at least one downtree message is transmitted within at least one slot of the broadcast frame additionally to the synchronization information.

In a further embodiment, the downtree message and the synchronization information are transmitted by means of one single message in the respective slot of the broadcast frame.

In a further embodiment, the downtree message and the synchronization information are transmitted by means of two separate messages in the respective slot of the broadcast frame.

In a further embodiment, at least one downtree message is broadcast to all nodes in the multi-hop network.

In a further embodiment, at least one downtree message is unicasted to one defined receiver node or at least one downtree message is multi-casted to a defined number of receiver nodes, wherein said at least one downtree message is relayed by any intermediate node being arranged between said root node and the respective receiver node.

In a further embodiment, the superframe is additionally provided with a downtree frame in case of a downtree frame request for activating said downtree frame, wherein the downtree frame is configured to transmit at least one downtree message to at least one sink node in the multi-hop network.

In a further embodiment, the downtree frame request for activating the downtree frame is transmitted to the child nodes by means of the assigned slots in the broadcast frame such that one single branch of the multi-hop network is activated.

In a further embodiment, the downtree frame request for activating the downtree frame is transmitted to the child nodes by means of the assigned slots in the broadcast frame such that a plurality of branches of the multi-hop network is activated.

In such a case, the downtree frame request may include a list of nodes, which are to be activated during the respective downtree frame.

Similar to the downtree frame, the uptree frame request for activating the uptree frame may be transmitted to the child nodes by means of the assigned slots in the broadcast frame such that one single branch of the multi-hop network is activated.

In a further embodiment, the uptree frame request for activating the uptree frame is transmitted to the child nodes by means of the assigned slots in the broadcast frame such that one single branch of the multi-hop network is activated.

In a further embodiment, the uptree frame request for activating the uptree frame is transmitted to the child nodes by means of the assigned slots in the broadcast frame such that a plurality of branches of the multi-hop network is activated.

In such a case, the uptree frame request may include a list of nodes, which are to be activated during the respective uptree frame.

The optional downtree and uptree frames may be used to transfer additional messages from and to the root node. Essentially, the regular traffic can be transferred during the broadcast and collection frames. Optional frames are then used for exceptional cases, e.g. sending additional messages that cannot be transferred during the broadcast or collection frames. The presence of an optional frame may be indicated by a flag set within the messages sent in the foregoing broadcast or collection frame.

In particular, the downtree frame may be used by a parent node to send additional messages to its child nodes. The parent node may indicate the need for a downtree frame by setting the flag mentioned before in the messages it sends in the broadcast frame. Only child nodes that see the flag set by their parents will then be in receiving mode for the duration of the downtree frame.

Moreover, the uptree frame may be used by a child node to send additional messages to its parent node. Similar to the downtree frame, a child node may request an uptree frame by setting the appropriate flag in the messages it sends to its parent node during the foregoing collection frame. Only parent nodes that see the flag set by one of its children will then be activated for the duration of the uptree frame.

Multiple nodes may send at the same time during the optional frames. Therefore, they may use Carrier-Sense Multiple Access (CSMA) to reduce collisions and interferences.

In a further embodiment, the uptree frame request for activating said uptree frame is transmitted by a respective child node to its parent node within a slot in the collection frame assigned for the parent node.

Thus, a transmission of the uptree frame request from the initially requesting node, the child node, to its parent node may be provided.

In a further embodiment, the uptree frame request for activating said uptree frame is relayed from an initially requesting node up to the root node.

In such a case, all the nodes of the network being arranged on the path from said initially requesting node to the root node may be activated during this optional uptree frame.

In a further embodiment, the downtree and uptree frames are time-slotted. Alternatively, the downtree and uptree frames may be non-slotted.

In a further embodiment, the superframe is provided with the broadcast frame, at least one collection frame, at least one downtree frame, at least one uptree frame, at least one listening frame and an empty frame. The listening frame may be used by un-synchronized nodes to exchange management messages with the sink node or root node. Un-synchronized nodes are those that either have lost the synchronization with their parents or do not have yet a parent, e.g. a node newly added to a running network. All synchronized nodes are in listening mode or receiving mode during this frame and forward messages received during this frame to the root node via their parents. To help un-synchronized nodes in detecting the begin of the listening frame, all messages that are sent by synchronized nodes may contain an indication of when the next listening frame will begin. For example, a node newly added to the network may listen to the channel and decode all received messages to determine when the next listening frame begins. Then, during the listening frame, it may send, e.g. using CSMA, a management message, e.g. a request for joining the network, to one of its neighboring nodes. The neighboring node may forward this message to the root during one of its assigned sending slots, e.g. during the collection frame.

Examples for values for the duration of frames and slots are as follows:
superframe: 5 s to 10 min;
slot: 10 ms to 50 ms;
broadcast frame: as many slots as parent nodes in the network;
collection frame: depends on the topology of the network and the number of messages they have to send to the root node per superframe, typically 50 to 200 slots;
listening frame: 2 to 5 slots;
downtree frame: 2 to 5 slots; and
uptree frame: 5 to 100 slots Any embodiment of the first aspect may be combined with any embodiment of the first aspect to obtain another embodiment of the first aspect.

According to a second aspect, the invention relates to a computer program comprising a program code for executing the method of the first aspect for transmitting data to and from nodes of a multi-hop network with a TDMA scheme when run on at least one computer.

According to a third aspect, a device for transmitting data to and from nodes of a multi-hop network with a TDMA scheme is suggested. The network is clustered by N clusters, each cluster of the N clusters has a number of the nodes. The device comprises an organizer, a provider, and a selector. The organizer is configured to organize the TDMA scheme into periodic superframes, wherein each superframe of the periodic superframes has a number of frames including at least one broadcast frame and one collection frame for the N clusters. The provider is configured to provide N separate communication channels to be used by the N clusters within the collection frame. Moreover, the selector is configured to select one communication channel from the N separate communication channels to be shared by the N clusters within the broadcast frame and to assign one of the separate N communication channels to one of the N clusters for use within the collection frame.

The organizer may be any organizing means. The provider may be any providing means. Moreover, the selector may be any selecting means.

The respective means, in particular the organizer, the provider and the selector, may be implemented in hardware or in software. If said means are implemented in hardware, it may be embodied as a device, e.g. as a computer or as a processor or as a part of a system, e.g. a computer system. If said means are implemented in software it may be embodied as a computer program product, as a function, as a routine, as a program code or as an executable object.

According to a fourth aspect, a multi-hop network is suggested which comprises a plurality of nodes. Each node of the plurality of nodes has a processor which enables the node to follow the TDMA scheme according to the method of the first aspect.

In the following, exemplary embodiments of the present invention are described with reference to the enclosed figures.

BRIEF DESCRIPTION OF THE DRAWINGS

Similar or functionally similar elements in the figures have been allocated the same reference signs if not otherwise indicated.

DETAILED DESCRIPTION OF THE EMBODIMENTS

The present invention may be adapted to a TDMA-based multi-hop network. The nodes of the multi-hop network may be arranged in different levels.

Figure 1:
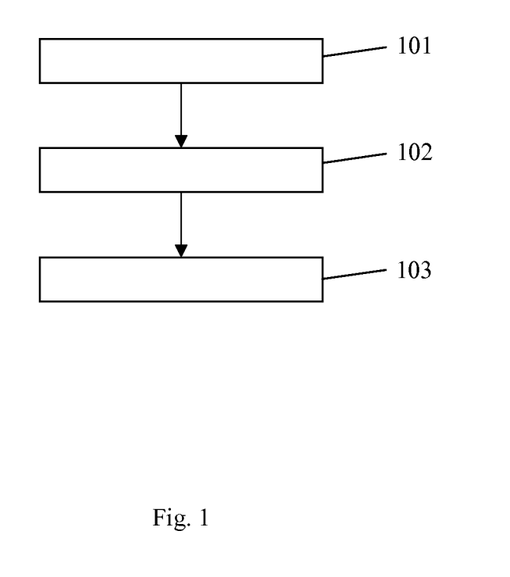
FIG. 1 shows a first embodiment of a sequence of method steps for transmitting data to and from nodes of a multi-hop network with a TDMA scheme.

In this regard, FIG. 1 shows a first embodiment of a sequence of method steps for transmitting data to and from nodes of a TMDA-based multi-hop network. The method of FIG. 1 is discussed with reference to FIG. 2, which shows a diagram of an embodiment of a TMDA-based multi-hop network.

Figure 2:
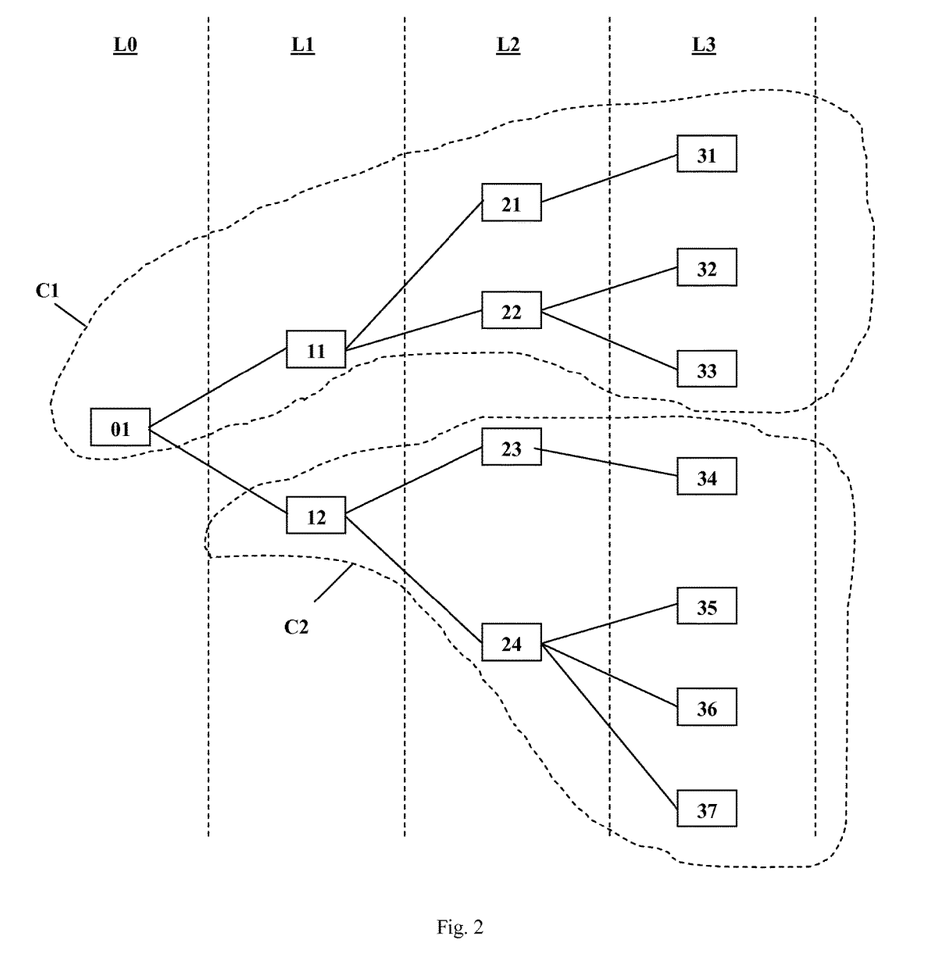
FIG. 2 shows a diagram of an embodiment of a TDMA-based multi-hop network.

With respect to FIG. 2, each node has a reference number comprising two characters. The first character shows the level of the respective node in the multi-hop network, wherein the root node has a "0" as a first character. The second character shows a consecutive number in the respective level. For example, in level L1, there is a first node indicated by 11 and a second node indicated by 12.

The routes towards the root node or sink node 01 form a tree with the sink node 01 as a root. In this regard, it is assumed that the tree construction is already performed. Further, the nodes 01 to 37 may be able to route messages based on source-routing information included in the message's header. Thus, a message may be relayed, which is sent by the sink node to the destination node in the multi-hop network.

The network of FIG. 2 is clustered into two clusters C1, C2 (N=2). Without loss of generality, the network of FIG. 2 has two clusters C1, C2. The first cluster C1 has the nodes 01, 11, 21, 22, 31, 32, and 33. Thus, the first cluster C1 includes the main base station 01. The second cluster C2 includes the nodes 12, 23, 24, 34, 35, 36, and 37. Each node 01-37 of the multi-hop network of FIG. 2 has a processor (not shown) which enables the node 01-37 to follow the TDMA scheme as described in steps 101-103 of FIG. 1.

In step 101, the TMDA scheme is organized by periodic superframes. The respective superframe has a number of frames including at least a broadcast frame and a collection frame.

Figure 3:
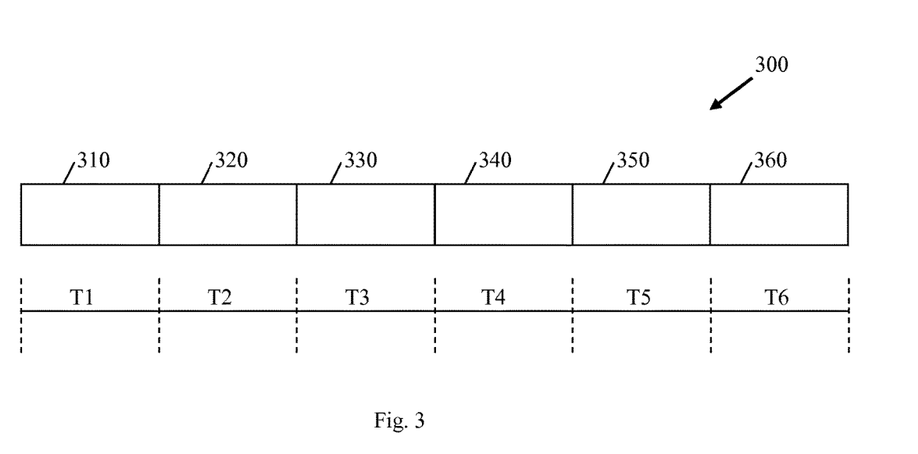
FIG. 3 shows a diagram of an embodiment of a superframe.

In this regard, FIG. 3 shows a diagram of an embodiment of a superframe 300. The superframe 300 of FIG. 3 has a broadcast frame 310, a collection frame 320, a listening frame 330, a downtree frame 340, an uptree frame 350 and an empty frame 360. The broadcast frame 310 may be particularly arranged at the beginning of the superframe 300.

The downtree frame 340 may be activated in the case of receiving a downtree frame request. The downtree frame 340 may be configured to transmit at least one downtree message to at least one node in the multi-hop network.

In particular, the downtree frame request may be transmitted to the child nodes by means of the assigned slots in the broadcast frame 310 such that one single branch of the multi-hop network is activated. Alternatively, the downtree frame request may be transmitted to the child nodes by means of the assigned slots in the broadcast frame 310 such that a plurality of branches of the multi-hop network is activated.

Said uptree frame 350 may be activated in case of an uptree frame request in the multi-hop network.

In particular, said uptree frame request may be transmitted to the child nodes by means of the assigned slots in the broadcast frame 310 such that one single branch of the multi-hop network is activated. Alternatively, the uptree frame request may be transmitted to the child nodes by means of the assigned slots in the broadcast frame 310 such that a plurality of branches of the multi-hop network is activated.

Furthermore, said collection frame 320 may be adapted to periodically transmit definite data to the root node 01. Said periodically transmitted definite data may be sensor data. Furthermore, said uptree frame request for activating said uptree frame 350 may be transmitted by a respective child node to its parent node within a slot in the collection frame 320 assigned for the parent node. In this regard, the uptree frame request 350 may be relayed from an initially requesting node up to the root node 01.

Further, the listening frame 330 may be adapted to exchange management messages within synchronized nodes in the multi-hop network.

During the empty frame 360 or empty part of the superframe 300, the nodes 01 to 37 are in sleeping mode.

Furthermore, the different frames 310-360 of the superframe 300 may have different time durations T1-T6.

In step 102, one dedicated communication channel is shared by the two clusters C1, C2 within the broadcast frame 310. In particular, main base station 01 uses one single broadcast tree that spans over all nodes 01-37 of the two clusters C1, C2 to distribute information to all further nodes 11-37 of the network using broadcast frame 310. Therein, the broadcast tree may be calculated from the topology of the network with the main base station 01 as a root.

In step 103, two separate communication channels are used by the two clusters C1, C2 within the collection frame 320. In particular, within the collection frame 320, each cluster C1, C2 has its own collection tree—with the nodes 01, 11, 21, 22, 31, 32, 33 for cluster C1, and with the nodes 12, 23, 24, 34, 35, 36, 37 for cluster C2—that spans only over the nodes that belong to the respective cluster C1, C2 and is used by the nodes of that cluster C1, C2 to exchange information with the base station 01, 12 of said clusters C1, C2. For the cluster C1, the node 01 is the base station. Further, for the cluster C2, the node 12 is the base station.

Further, the respective collection tree of the respective cluster C1, C2, is calculated from the topology of the respective cluster C1, C2 with the respective base station 01, 12 of the cluster C1, C2 as the root. For example, the collection tree of the cluster C1 is calculated from the topology of the cluster C1 with the base station 01 of the cluster C1 as root. Further, the collection tree of the cluster C2 is calculated from the topology of the cluster C2 with the base station 12 of the cluster C2 as root. The topologies of the collection trees of the clusters C1, C2 do not necessarily have to overlap with the broadcast tree as shown in FIG. 2. For instance, node 35 could also send its data over 23 to the base station 12.

Figure 4:
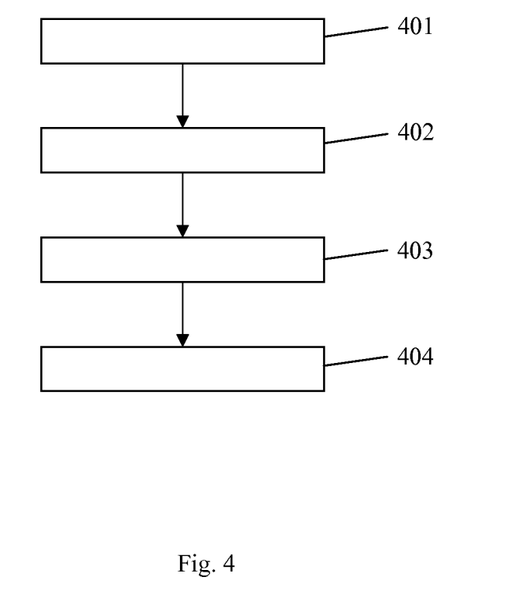
FIG. 4 shows a second embodiment of a sequence of method steps for transmitting data to and from nodes of a multi-hop network with a TDMA scheme.

In FIG. 4 a second embodiment of the sequence of method steps for transmitting data to and from nodes of a multi-hop network with a TDMA scheme is depicted. The embodiment of FIG. 4 has the method steps 401-404:

In step 401, the TDMA scheme is organized by periodic superframes such that each superframe 300 has at least a broadcast frame 310, a collection frame 320 and a listening frame 330.

In step 402, one dedicated communication channel is shared by the two clusters C1, C2 within the broadcast frame 310.

In step 403, two separate communication channels are used by the two clusters C1, C2 within the collection frame 320.

Further, in step 404, the one dedicated channel is shared by the two clusters C1, C2 within the listening frame 330.

For synchronizing un-synchronized nodes 01-37 with the network, information is exchanged using CSMA or MACA in the listening frame 330. Alternatively, for synchronizing the un-synchronized nodes 01-37 with the network, a black-burst may be transmitted at the beginning of the listening frame 330.

Figure 5:
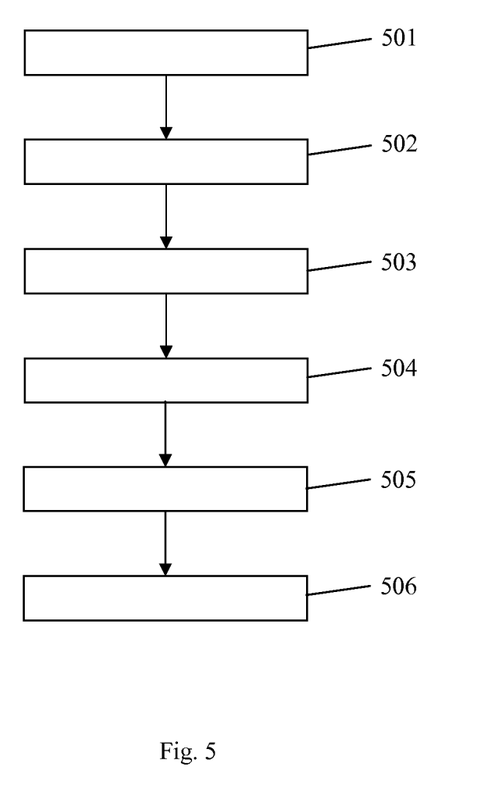
FIG. 5 shows a third embodiment of a sequence of method steps for transmitting data to and from nodes of a multi-hop network with a TDMA scheme.

In FIG. 5, a third embodiment of the sequence of method steps for transmitting data to and from nodes 01-37 of a multi-hop network with a TDMA scheme is illustrated. The embodiment of FIG. 5 has the method steps 501-506:

In step 501, the TDMA scheme is organized by periodic superframes such that each superframe 300 has at least a broadcast frame 310, a collection frame 320, a listening frame 330, a downtree frame 340 and an uptree frame 350.

In step 502, one dedicated communication channel is shared by the two clusters C1, C2 within the broadcast frame.

In step 503, two separate communication channels are used by the two clusters C1, C2 within the collection frame.

In step 504, the one dedicated communication channel is shared by the two clusters C1, C2 within the listening frame 330.

In step 505, the two separate communication channels are used by the two clusters C1, C2 within the downtree frame 340.

In an analogous way, in step 506 the two separate communication channels are used by the two clusters C1, C2 within the uptree frame 350.

Figure 6:
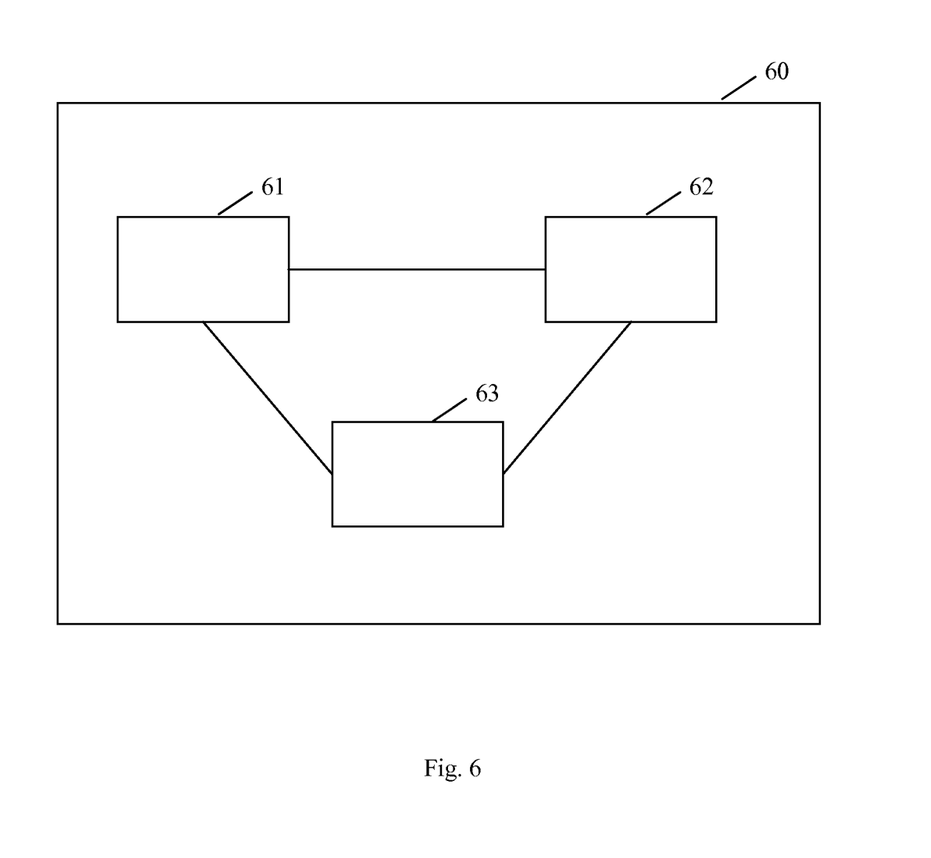
FIG. 6 shows a block diagram of a device for transmitting data to and from nodes of a multi-hop network with a TDMA scheme.

FIG. 6 shows a block diagram of a device 60 for transmitting data to and from nodes of a multi-hop network with a TDMA scheme. The network is clustered by N clusters C1, C2. Each cluster C1, C2 has a number of nodes 01, 11, 21, 22, 31, 32, 33; 12, 23, 24, 34, 35, 36, 37 (see FIG. 2).

The device 60 comprises an organizer 61, a provider 62 and a selector 63. The organizer 61 is configured to organize the TDMA scheme into periodic superframes, wherein each superframe of the periodic superframes has a number of frames including at least one broadcast frame and one collection frame for the N clusters.

The provider 62 is configured to provide N separate communication channels to be used by the N clusters within the collection frame.

Moreover, the selector 63 is configured to select one communication channel from the N separate communication channels to be shared by the N clusters within the broadcast frame and to assign one of the separate N communication channels to one of the N clusters for use within the collection frame.

Figure 7:
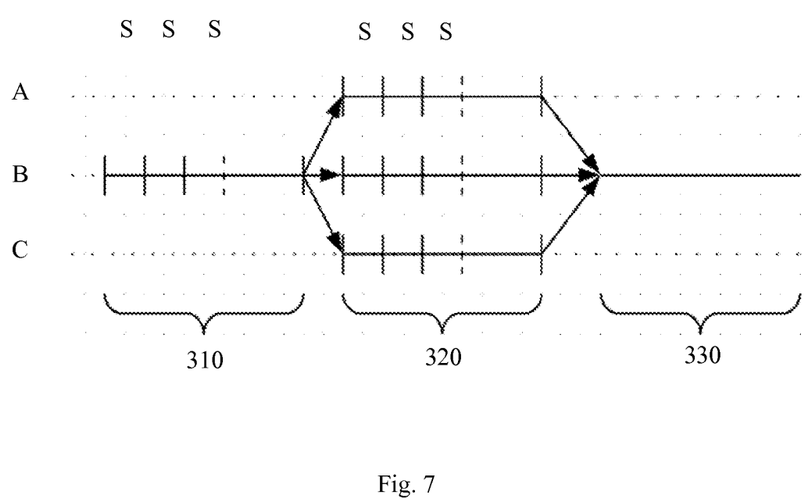
FIG. 7 shows a schematic TDMA scheme with a broadcast frame, a collection frame, a listening frame and three communication channels.

FIG. 7 shows a schematic TDMA scheme with a broadcast frame 310, a collection frame 320, a listening frame 330 and three communication channels A, B, C for three clusters C1, C2, and C3. Each of the broadcast frame 310, the collection frame 320, and the listening frame 330 is time-slotted having a number of slots S.

Within the broadcast frame 310, and within the listening frame 330, the communication channel B is shared by the three clusters C1, C2, C3. In contrast, within the collection frame 320, each cluster C1, C2, C3 uses a separate one of the channels A, B, C. Assuming that there are three channels A, B, C for the three clusters C1, C2, C3, the cluster C1 may use channel A, the cluster C2 may use channel B and the cluster C3 may use channel C within the collection frame 320.

The shared channel B for the shared broadcast and listening frames 310, 330 may also be called synchronization channel, because it may be used to distribute a time reference to all nodes in the network. Thus, an easy and simple way for time-synchronizing the clusters C1, C2, C3 is provided.

In detail, each cluster C1, C2, C3 has its own collection frame 320 which are sent over different channels A, B, C. Further, cluster C2 may use another channel for its collection frame 320 than the synchronization channel B.

Regarding the position of the listening frame 330 in FIG. 7, it may be noted that the listening frame 330 follows the collection frame 320. In this case, the information about its position may be sent by the leaf nodes in their collection slots. The information about its position is broadcasted in the broadcast frame 310 as well, such that the listening frame 330 may be forwarded, e.g. directly following the broadcast frame 310.

Computerized devices can be suitably designed for implementing embodiments of the present invention as described herein. In that respect, it can be appreciated that the methods described herein are largely non-interactive and automated. In exemplary embodiments, the methods described herein can be implemented either in an interactive, partly-interactive or non-interactive system. The methods described herein can be implemented in software (e.g., firmware), hardware, or a combination thereof. In exemplary embodiments, the methods described herein are implemented in software, as an executable program, the latter executed by suitable digital processing devices. In further exemplary embodiments, at least one step or all steps of above method of FIG. 1, 4 or 5 may be implemented in software, as an executable program, the latter executed by suitable digital processing devices. More generally, embodiments of the present invention can be implemented wherein general-purpose digital computers, such as personal computers, workstations, etc., are used.

Figure 8:
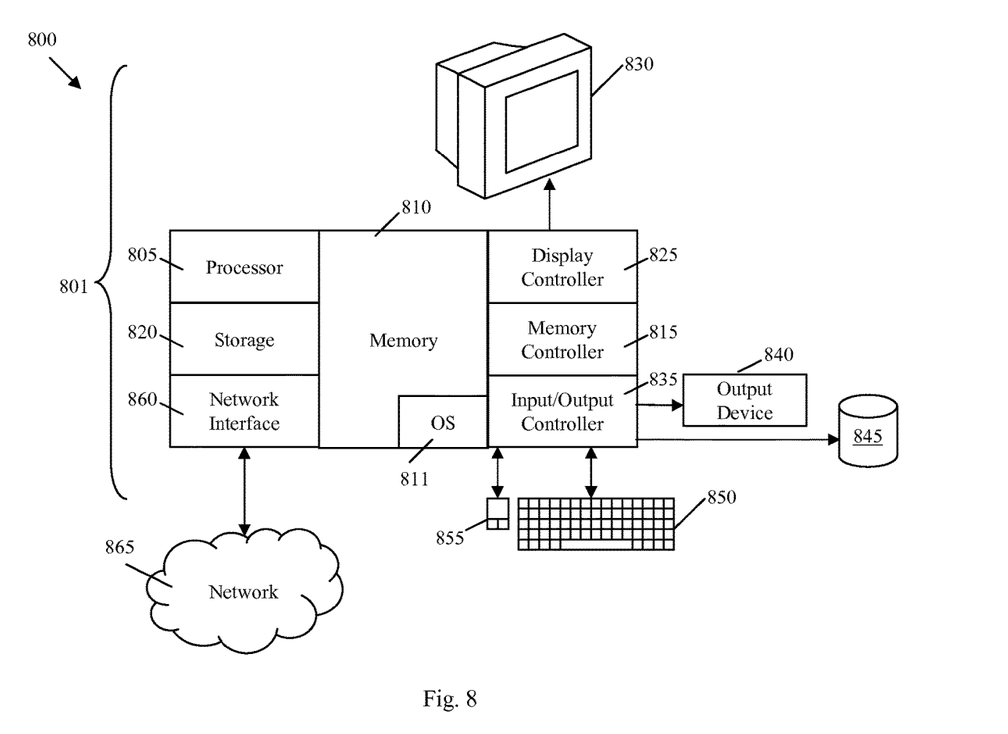
FIG. 8 shows a schematic block diagram of an embodiment of a system adapted for performing the method for transmitting data to and from nodes of a multi-hop network with a TDMA scheme.

For instance, the system 800 depicted in FIG. 8 schematically represents a computerized unit 801, e.g., a general-purpose computer. For example, the system 800 may embody a node 01-37 as shown in FIG. 2. In exemplary embodiments, in terms of hardware architecture, as shown in FIG. 8, the unit 801 includes a processor 805, memory 810 coupled to a memory controller 815, and one or more input and/or output (I/O) devices 840, 845, 850, 855 (or peripherals) that are communicatively coupled via a local input/output controller 835. The input/output controller 835 can be, but is not limited to, one or more buses or other wired or wireless connections, as is known in the art. The input/output controller 835 may have additional elements, which are omitted for simplicity, such as controllers, buffers (caches), drivers, repeaters, and receivers, to enable communications. Further, the local interface may include address, control, and/or data connections to enable appropriate communications among the aforementioned components. For example, the processor 805 may be configured to enable the node 01-37 to follow the TDMA scheme as described in one of the embodiments of FIG. 1, 4 or 5.

The processor 805 is a hardware device for executing software, particularly that stored in memory 810. The processor 805 can be any custom made or commercially available processor, a central processing unit (CPU), an auxiliary processor among several processors associated with the computer 801, a semiconductor based microprocessor (in the form of a microchip or chip set), or generally any device for executing software instructions.

The memory 810 can include any one or combination of volatile memory elements (e.g., random access memory) and nonvolatile memory elements. Moreover, the memory 810 may incorporate electronic, magnetic, optical, and/or other types of storage media. Note that the memory 810 can have a distributed architecture, where various components are situated remote from one another, but can be accessed by the processor 805.

The software in memory 810 may include one or more separate programs, each of which comprises an ordered listing of executable instructions for implementing logical functions. In the example of FIG. 8, the software in the memory 810 includes methods described herein in accordance with exemplary embodiments and a suitable operating system (OS) 811. The OS 811 essentially controls the execution of other computer programs, such as the methods as described herein (e.g., FIG. 1, 4 or 5), and provides scheduling, input-output control, file and data management, memory management, and communication control and related services.

The methods described herein may be in the form of a source program, executable program (object code), script, or any other entity comprising a set of instructions to be performed. When in a source program form, then the program needs to be translated via a compiler, assembler, interpreter, or the like, as known per se, which may or may not be included within the memory 810, so as to operate properly in connection with the OS 811. Furthermore, the methods can be written as an object oriented programming language, which has classes of data and methods, or a procedure programming language, which has routines, subroutines, and/or functions.

Possibly, a conventional keyboard 850 and mouse 855 can be coupled to the input/output controller 835. Other I/O devices 840-855 may include sensors (especially in the case of network elements), i.e., hardware devices that produce a measurable response to a change in a physical condition like temperature or pressure (physical data to be monitored). Typically, the analog signal produced by the sensors is digitized by an analog-to-digital converter and sent to controllers 835 for further processing. Sensor nodes are ideally small, consume low energy, are autonomous and operate unattended.

In addition, the I/O devices 840-855 may further include devices that communicate both inputs and outputs. The system 800 can further include a display controller 825 coupled to a display 830. In exemplary embodiments, the system 800 can further include a network interface or transceiver 860 for coupling to a network 865.

The network 865 transmits and receives data between the unit 801 and external systems. The network 865 is possibly implemented in a wireless fashion, e.g., using wireless protocols and technologies, such as IEEE 802.15.4 or similar. The network 865 may be a fixed wireless network, a wireless local area network (LAN), a wireless wide area network (WAN) a personal area network (PAN), a virtual private network (VPN), intranet or other suitable network system and includes equipment for receiving and transmitting signals.

When the unit 801 is in operation, the processor 805 is configured to execute software stored within the memory 810, to communicate data to and from the memory 810, and to generally control operations of the computer 801 pursuant to the software. The methods described herein and the OS 811, in whole or in part are read by the processor 805, typically buffered within the processor 805, and then executed. When the methods described herein (e.g. with reference to FIG. 1, 4 or 5) are implemented in software, the methods can be stored on any computer readable medium, such as storage 820, for use by or in connection with any computer related system or method.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects. Furthermore, aspects of the present invention may take the form of a computer program product embodied in one or more computer readable medium(s) having computer readable program code embodied thereon. Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the unit 801, partly thereon, partly on a unit 801 and another unit 801, similar or not.

Aspects of the present invention are described above with reference to flowchart illustrations and/or block diagrams of methods, apparatus (systems) and computer program products according to embodiments of the invention. It will be understood that each block of the flowchart illustrations and/or block diagrams can be implemented by one or more computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved and algorithm optimization. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

More generally, while the present invention has been described with reference to certain embodiments, it will be understood by those skilled in the art that various changes may be made and equivalents may be substituted without departing from the scope of the present invention. In addition, many modifications may be made to adapt a particular situation to the teachings of the present invention without departing from its scope. Therefore, it is intended that the present invention not be limited to the particular embodiments disclosed, but that the present invention will include all embodiments falling within the scope of the appended claims.

REFERENCES

[1] Younis O. et al, "Node Clustering in Wireless Sensor Networks: Recent Developments and Deployment Challenges", IEEE Networks, May/June 2006
[2] Abbasi A. A. and Younis M., "A survey on clustering algorithms for wireless sensor networks", Computer Communications, 30 (2007)
[3] Sobrinho, J. L., and Krishnakumar, A. S. (1999). "Quality-of-service in ad hoc carrier sense multiple access wireless networks", IEEE Journal on Selected Areas in Communications, 17(8), 1353-1368
[4] Bachir A, Dohler M, Watteyne T, Leung KK. MAC Essentials for Wireless Sensor Networks. IEEE Communications Surveys & Tutorials. 2010; 12(2):222-248
[5] P. Karn, "MACA—A New Channel Access Method for Packet Radio," in 9th ARRL Computer Networking Conference, 1990.

The invention claimed is:

1. A method for transmitting data to and from nodes of a multi-hop network with a Time Division Multiple Access (TDMA) scheme,
wherein the multi-hop network is clustered into a plurality of N clusters and each cluster of the plurality of N clusters includes a plurality of nodes, the method comprising:
organizing the TDMA scheme into a plurality of periodic superframes,
wherein each superframe of the plurality of periodic superframes comprises a number of frames including a broadcast frame and a collection frame for the plurality of N clusters;
sharing a dedicated communication channel by the plurality of N clusters in the broadcast frame,
wherein each node uses the dedicated communication channel in the broadcast frame;
transmitting data using a plurality of N separate communication channels by the plurality of N clusters in the collection frame;
each cluster of the plurality of N clusters has one node acting as a base station of the cluster;
among a plurality of N base stations of the plurality of N clusters, one base station acts as a main base station;
the main base station uses the broadcast frame to distribute information via a single broadcast tree that spans over all of the plurality of nodes of the plurality of N clusters;
the collection frame uses a collection tree that spans over only the plurality of nodes that belong to the cluster in each cluster of the plurality of N clusters;
the plurality of nodes of the cluster uses the collection tree to exchange information with the base station of the cluster;
the broadcast tree and each collection tree in the multi-hop network is hierarchically arranged in a plurality of different levels;
the plurality of different levels include:
(i) one root node;
(ii) at least one parent node which is the parent of at least one child node, and
(iii) at least one child node; and
the child node is arranged in a lower level than the parent node.

2. The method of claim 1,
wherein: a configuration phase comprises a channel indication which is provided to each node of a plurality of nodes of the multi-hop network; and
the channel indication indicates the communication channel allocated to the node in the collection frame.

3. The method of claim 1,
wherein: the broadcast tree is calculated from a whole topology of the multi-hop network; and
the main base station is a root.

4. The method of claim 1,
wherein: the collection tree of the cluster is calculated from a topology of the cluster; and
the base station of the cluster is a root.

5. The method of claim 1, wherein:
each superframe of the plurality of periodic superframes has at least the broadcast frame, the collection frame, and a listening frame;
the broadcast frame comprises the dedicated communication channel which is shared by the plurality of N clusters;
the collection frame comprises the plurality of N separate communication channels that are used by the plurality of N clusters; and
the listening frame comprises the dedicated communication channel which is shared by the plurality of N clusters.

6. The method of claim 5,
wherein a black-burst is transmitted at the beginning of the listening frame for synchronizing the plurality of un-synchronized nodes in the multi-hop network.

7. The method of claim 5,
wherein, information is exchanged using either a Carrier-Service Multiple Access (CSMA) or a Multiple Access with Collision Avoidance (MACA) in the listening frame for synchronizing a plurality of un-synchronized nodes with the multi-hop network.

8. The method of claim 7,
wherein the superframe comprises the broadcast frame which is followed by the listening frame.

9. The method of claim 1, wherein:
each superframe of the plurality of periodic superframes comprises: the broadcast frame, the collection frame, a listening frame, a downtree frame, and an uptree frame;
the broadcast frame and the listening frame comprise a dedicated communication channel which is shared by the plurality of N clusters; and
the collection frame, the downtree frame, and the uptree frame comprise the plurality of N separate communication channels which are used by the plurality of N clusters.

10. The method of claim 1,
wherein: the multi-hop network comprises a plurality of nodes; and
each node of the plurality of nodes has a processor which enables the node to follow the method.

* * * * *